US011864588B2

(12) United States Patent
Moloney et al.

(10) Patent No.: US 11,864,588 B2
(45) Date of Patent: Jan. 9, 2024

(54) ELECTRONIC AEROSOL PROVISION SYSTEM

(71) Applicant: NICOVENTURES TRADING LIMITED, London (GB)

(72) Inventors: Patrick Moloney, London (GB); Colin Dickens, London (GB)

(73) Assignee: Nicoventures Trading Limited, London (GB)

( * ) Notice: Subject to any disclaimer, the term of this patent is extended or adjusted under 35 U.S.C. 154(b) by 551 days.

(21) Appl. No.: 15/733,278

(22) PCT Filed: Dec. 19, 2018

(86) PCT No.: PCT/GB2018/053682
§ 371 (c)(1),
(2) Date: Jun. 19, 2020

(87) PCT Pub. No.: WO2019/122866
PCT Pub. Date: Jun. 27, 2019

(65) Prior Publication Data

US 2020/0383378 A1 Dec. 10, 2020

(30) Foreign Application Priority Data

Dec. 22, 2017 (GB) ..................................... 1721766

(51) Int. Cl.
*A24F 47/00* (2020.01)
*A24F 40/40* (2020.01)
(Continued)

(52) U.S. Cl.
CPC ............. *A24F 40/40* (2020.01); *A24F 40/42* (2020.01); *A24F 40/46* (2020.01); *A24F 40/51* (2020.01);
(Continued)

(58) Field of Classification Search
CPC .......... A24F 40/10; A24F 40/40; A24F 40/42; A24F 40/46
See application file for complete search history.

(56) References Cited

U.S. PATENT DOCUMENTS

2014/0334802 A1 11/2014 Dubief
2015/0245669 A1 9/2015 Cadieux et al.
(Continued)

FOREIGN PATENT DOCUMENTS

CN 106455711 A 2/2017
CN 106793833 A 5/2017
(Continued)

OTHER PUBLICATIONS

International Preliminary Report on Patentability for Application No. PCT/GB2018/053682, dated Jul. 2, 2020, 8 pages.
(Continued)

*Primary Examiner* — Eric Yaary
(74) *Attorney, Agent, or Firm* — Patterson Thuente PA

(57) ABSTRACT

Described is an aerosol provision system including a device part and a removable cartridge part, wherein the cartridge part is coupled to the device part for use; and wherein the device part includes a heater; and the cartridge part includes a reservoir for source liquid and a vaporization surface arranged to be in fluid communication with the reservoir for source liquid, wherein the vaporization surface is brought into thermal communication with the heater when the cartridge part is coupled to the device part for use such that the vaporization surface is heated when the heater is activated to cause vaporization of at least a portion of source liquid in fluid communication with the vaporization surface. There has also been described a cartridge part, a device part, and a method of producing a vapor for inhalation.

21 Claims, 8 Drawing Sheets

(51) Int. Cl.

| | |
|---|---|
| ***A24F 40/46*** | (2020.01) |
| ***A24F 40/42*** | (2020.01) |
| ***A24F 40/51*** | (2020.01) |
| ***H05B 1/02*** | (2006.01) |
| *A24F 40/10* | (2020.01) |
| *H05B 3/12* | (2006.01) |

(52) U.S. Cl.

CPC ............ *H05B 1/0227* (2013.01); *A24F 40/10* (2020.01); *H05B 3/12* (2013.01)

(56) References Cited

U.S. PATENT DOCUMENTS

| | | | |
|---|---|---|---|
| 2015/0351456 | A1 | 12/2015 | Johnson et al. |
| 2016/0235122 | A1 | 8/2016 | Krietzman |
| 2016/0324215 | A1 | 11/2016 | Mironov et al. |
| 2016/0353802 | A1* | 12/2016 | Malgat .................... A24F 40/70 |
| 2017/0095002 | A1 | 4/2017 | Silvestrini |
| 2017/0295844 | A1* | 10/2017 | Thevenaz ............ H05B 1/0244 |
| 2017/0354180 | A1* | 12/2017 | Fornarelli ................ H05B 3/04 |
| 2017/0360092 | A1 | 12/2017 | Althorpe et al. |
| 2020/0046026 | A1* | 2/2020 | Pijnenburg ............... H05B 3/06 |

FOREIGN PATENT DOCUMENTS

| | | | |
|---|---|---|---|
| EP | 3110270 | A1 | 1/2017 |
| EP | 3113637 | A1 | 1/2017 |
| JP | 2017506915 | A | 3/2017 |
| JP | 2017524353 | A | 8/2017 |
| KR | 20160127793 | A | 11/2016 |
| KR | 20160145838 | A | 12/2016 |
| RU | 2597531 | C2 | 9/2016 |
| RU | 2608915 | C2 | 1/2017 |
| WO | WO-2015131058 | A1 | 9/2015 |
| WO | WO-2015197627 | A1 | 12/2015 |
| WO | WO-2016079151 | A1 | 5/2016 |
| WO | WO-2016079152 | A1 | 5/2016 |
| WO | WO-2016118005 | A1 | 7/2016 |
| WO | WO-2016150922 | A2 | 9/2016 |
| WO | WO-2016172802 | A1 | 11/2016 |
| WO | WO-2017042081 | A1 | 3/2017 |

OTHER PUBLICATIONS

Office Action For Japanese Application No. 2020-529374, dated Aug. 3, 2021, 12 pages.

Search Report for Russian Application No. 2020120675 dated Mar. 10, 2021, 2 pages.

* cited by examiner

ELECTRONIC AEROSOL PROVISION SYSTEM

PRIORITY CLAIM

The present application is a National Phase entry of PCT Application No. PCT/GB2018/053682, filed Dec. 19, 2018, which claims priority from GB Application No. 1721766.2, filed Dec. 22, 2017, each of which is hereby fully incorporated herein by reference.

TECHNICAL FIELD

The present disclosure relates to electronic aerosol provision systems such as electronic cigarettes and the like.

BACKGROUND

Electronic aerosol provision systems such as electronic cigarettes (e-cigarettes) generally contain a reservoir of a source liquid containing a formulation, typically including nicotine, from which a vapor is generated, e.g. through heat vaporization. A vapor source for an aerosol provision system may thus comprise a heater having a heating element arranged to receive source liquid from the reservoir, for example through wicking/capillary action. While a user inhales on the system, electrical power is supplied to the heating element to vaporize source liquid in the vicinity of the heating element to generate a vapor for inhalation by the user. Such systems are usually provided with one or more air inlet holes located away from a mouthpiece end of the system. When a user sucks on a mouthpiece connected to the mouthpiece end of the system, air is drawn in through the inlet holes and past the vapor source. There is a flow path connecting between the vapor source and an opening in the mouthpiece so that air drawn past the vapor source continues along the flow path to the mouthpiece opening, carrying some of the vapor from the vapor source with it in the form of an aerosol. The aerosol exits the aerosol provision system through the mouthpiece opening for inhalation by the user.

In such systems, the vapor source and heating element may be provided in a disposable " " "cartomizer", which is a component that includes both a reservoir for receiving the source liquid and a heating element. The cartomizer is coupled in use to a reusable part (sometimes referred to as "device" section) that includes various electronic components that can be used to operate the aerosol provision system, such as control circuitry and a battery. The heating element is provided with electrical power from the battery via an electrical connection between the cartomizer and reusable device part. Once the source liquid in the cartomizer is used up (i.e., substantially all the source liquid is vaporized and inhaled), the user replaces the cartomizer and installs a new cartomizer to continue generating and inhaling vaporized liquid.

The cartomizer itself can be of a complex design and may require many different components to be installed in the body of the cartomizer. The manufacturing cost and complexity required to produce and assemble these cartomizers can be relatively high.

Various approaches are described which seek to help address some of these issues.

SUMMARY

According to a first aspect of certain embodiments there is provided an aerosol provision system including a device part and a removable cartridge part, wherein the cartridge part is coupled to the device part for use; and wherein the device part comprises a heater; and the cartridge part comprises a reservoir for source liquid and a vaporization surface arranged to be in fluid communication with the reservoir for source liquid, wherein the vaporization surface is brought into thermal communication with the heater when the cartridge part is coupled to the device part for use such that the vaporization surface is heated when the heater is activated to cause vaporization of at least a portion of source liquid in fluid communication with the vaporization surface.

According to a second aspect of certain embodiments there is provided a cartridge part for use with a reusable device part comprising a heater, wherein the cartridge part is capable of being coupled to the device part for use to form an aerosol provision system, wherein the cartridge part comprises a reservoir for source liquid and a vaporization surface arranged to be in fluid communication with the reservoir for source liquid, wherein the vaporization surface is brought into thermal communication with the heater when the cartridge part is coupled to the reusable device part for use such that the vaporisation surface is heated when the heater is activated to cause vaporization of at least a portion of source liquid in fluid communication with the vaporization surface.

According to a third aspect of certain embodiments there is provided a device part for use with a cartridge part, wherein the cartridge part is capable of being coupled to the device part for use to form an aerosol provision system, wherein the cartridge part comprises a reservoir for source liquid and a vaporization surface arranged to be in fluid communication with the reservoir for source liquid, the device part comprising: a heater, wherein the heater is arranged such that, when the cartridge part is coupled to the device part for use, the vaporization surface is brought into thermal communication with the heater such that the vaporization surface is heated when the heater is activated to cause vaporization of at least a portion of source liquid in fluid communication with the vaporization surface.

According to a fourth aspect of certain embodiments there is provided a method of configuring an aerosol provision device for use, the device including a device part and a removable cartridge part, the method comprising: coupling the device part to the cartridge part, wherein the device part comprises a heater and the cartridge part comprises a reservoir for source liquid and a vaporization surface arranged to be in fluid communication with the reservoir for source liquid, wherein the vaporization surface is brought into thermal proximity with the heater when the cartridge part is coupled to the device part for use such that the vaporization surface is heated when the heater is activated to cause vaporization of at least a portion of source liquid in fluid communication with the vaporization surface.

According to a fifth aspect of certain embodiments there is provided a vapor provision means including a reusable device part and a removable cartridge part, wherein the cartridge part is coupled to the reusable device part for use; and wherein the reusable device part comprises heating means; and the cartridge part comprises reservoir means for storing a source liquid and a vaporization surface arranged to be in fluid communication with the reservoir for source liquid, wherein the vaporization surface is brought into thermal communication with the heating means when the cartridge part is coupled to the reusable device part for use such that the vaporization surface is heated when the heating means is activated to cause vaporization of at least a portion of source liquid in fluid communication with the vaporization surface.

It will be appreciated that features and aspects of the disclosure described above in relation to the first and other aspects of the disclosure are equally applicable to, and may be combined with, embodiments of the disclosure according to other aspects of the disclosure as appropriate, and not just in the specific combinations described above.

BRIEF DESCRIPTION OF THE DRAWINGS

Embodiments of the disclosure will now be described, by way of example only, with reference to the accompanying drawings, in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

As described above, the present disclosure relates to (but is not limited to) vapor delivery devices, such as electronic cigarettes (e-cigarettes). Throughout the following description the term "electronic cigarette" may sometimes be used; however, it will be appreciated this term may be used interchangeably with vapor (aerosol) delivery system. Additionally, the terms " " "vapor" and "aerosol" may be used interchangeably to refer to vaporized source liquid or air containing vaporized source liquid.

Figure 1:
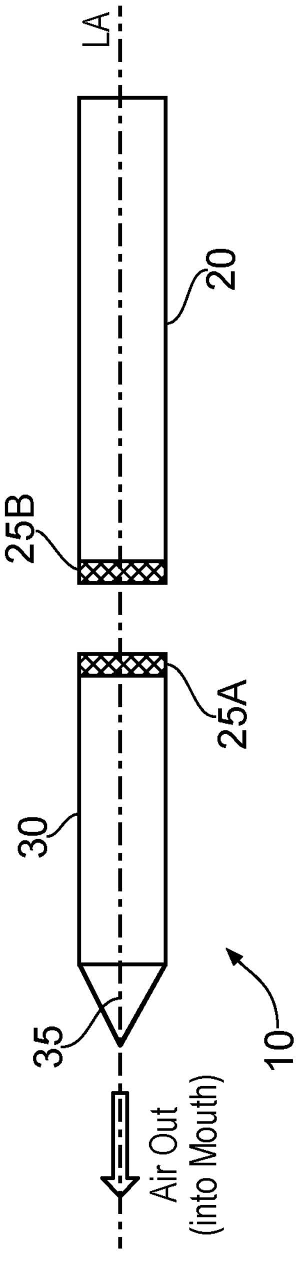
FIG. 1 schematically represents an example e-cigarette which includes a cartridge part having an integrated heating element and a reusable device part in a decoupled state.
Figure 2:
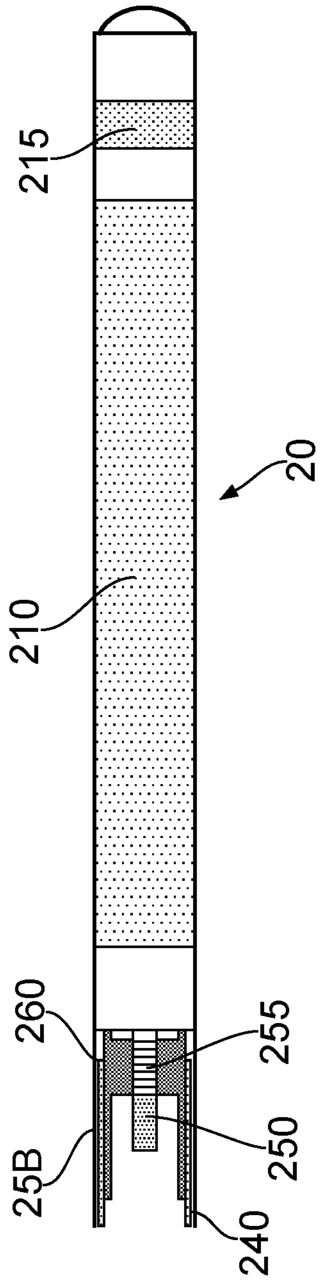
FIG. 2 schematically represents the reusable device part of the example e-cigarette of FIG. 1 in more detail.
Figure 3:
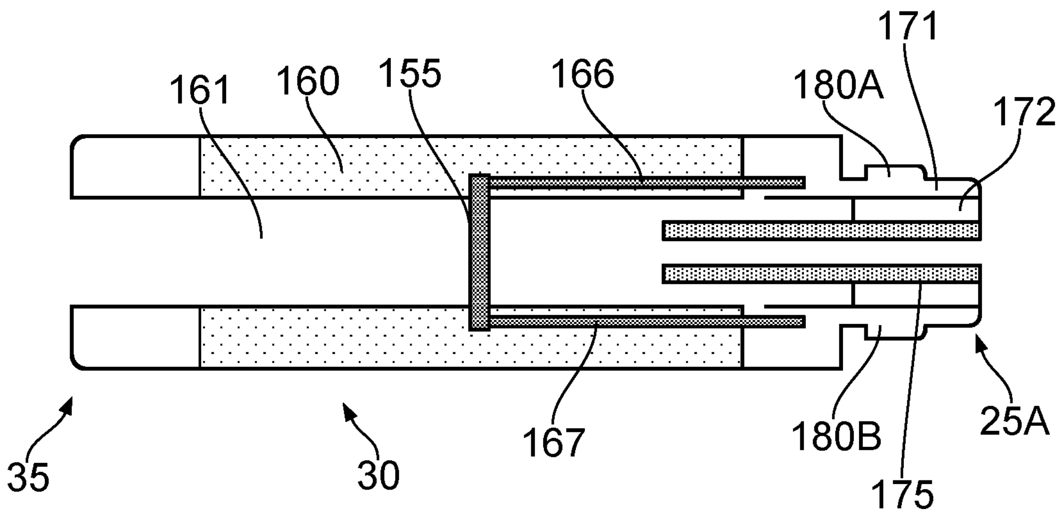
FIG. 3 schematically represents the cartridge part of the example e-cigarette of FIG. 1 in more detail.

FIGS. 1 to 3 are schematic diagrams illustrating aspects of an example e-cigarette 10. The e-cigarette 10 has a generally cylindrical shape, extending along a longitudinal axis indicated by dashed line LA, and comprises two main components, namely a reusable device part 20 and a detachable/replaceable cartridge part 30 as shown in FIG. 1. FIGS. 2 and 3 provide schematic diagrams of the reusable part 20 and cartridge part 30 respectively of the e-cigarette of FIG. 1. Note that various components and details, e.g. such as wiring and more complex shaping, have been omitted from FIGS. 2 and 3 for reasons of clarity.

The cartridge part 30 includes an internal a liquid reservoir 160 containing a source liquid, which may include nicotine, to be vaporized and inhaled, a vaporizer (such as a heating element 155), and a mouthpiece 35. The heating element 155 is, in this example, a resistance wire (such as a Nichrome wire) wrapped around a wicking material or similar facility to transport liquid from the reservoir 160 to the resistance wire.

The reusable device part 20 generally includes components with operating lifetimes longer than the expected lifetime of the replaceable cartridge part 30. The reusable device part 20 includes a power source, such as a battery 210 or cell to provide power to the e-cigarette 10 and control circuitry (discussed in more detail below) for generally controlling various functions of the e-cigarette 10. When the heating element 155 receives power from the battery (not shown in FIG. 1), as controlled by the control circuitry, the heating element 155 vaporizes the source liquid and this vapor (aerosol) is then inhaled by a user through the mouthpiece 35.

In the embodiment shown in FIG. 1, the reusable device part 20 and cartridge part 30 are detachable from one another by separating in a direction parallel to the longitudinal axis LA, but are joined together when the e-cigarette 10 is in use by a connection, indicated schematically as 25A (on the cartridge part 30) and 25B (on the reusable device part 20), to provide mechanical and electrical connectivity between the reusable device part 20 and the cartridge part 30. The connectors 25A and 25B in this example are used to provide a bayonet fitting for connecting the cartridge part 30 to the reusable device part 20, although other coupling mechanisms may be employed (e.g., screw thread).

In many devices, the cartridge part 30 is detached from the reusable device part 20 for replacement of the cartridge part 30 when the supply of source liquid is exhausted or if the user wishes to change the flavor/type of source liquid, and is replaced with another cartridge part 30, if so desired. In contrast, the reusable device part 20 is normally reusable with a succession of cartridge parts 30.

Turning now to FIG. 2, the reusable device part 20 includes a battery 210 and control circuitry including a circuit board 215 to provide control functionality for the e-cigarette, e.g. by provision of a (micro)controller, processor, ASIC or similar form of control chip. The control chip may be mounted to a printed circuit board (PCB). The battery 210 is typically cylindrical in shape, and has a central axis that lies along, or at least close to (and generally parallel with), the longitudinal axis LA of the e-cigarette. The circuit board 215 in the example shown also includes a sensor unit. If a user inhales on the mouthpiece 35, air is drawn into the e-cigarette 10 through one or more air inlet holes (not shown in FIGS. 1 and 2). The sensor unit, which may include a pressure sensor and/or microphone, detects this airflow, and in response to such a detection, the circuit board 215 provides power from the battery 210 to the heating element 155 in the cartridge part 30 (this is generally referred to as puff actuation). In other examples, the e-cigarette 10 may be provided with a button or switch that a user can operate to provide power from the battery to the heating element 155.

Turning now to FIG. 3, the cartridge part 30 includes an air passage 161 extending along the central (longitudinal) axis of the cartridge part 30 (and e-cigarette 10) from the mouthpiece 35 to the connector 25A, which joins the cartridge part 30 to the reusable part 20. The reservoir of source liquid 160 is provided around the air passage 161. This reservoir 160 may be implemented, for example, by providing cotton or foam soaked in the source liquid, or the source liquid may be held freely within a suitable container. The heating element 155 is powered through lines 166 and 167, which are in turn connected to opposing polarities (positive and negative, or vice versa) of the battery 210 via connector 25A.

Although not shown in FIG. 3, the cartridge part 30 may include a heating element temperature sensor configured to sense a temperature of the heating element 155. The heater temperature sensor is disposed in the cartridge part 30 but coupled to the circuit board 215, e.g., through connectors 25A and 25B. Accordingly, the circuit board 215 is able to control the power supplied to the heating element 155 based on the derived temperature of the heating element 155.

As mentioned above, the connectors 25A and 25B provide mechanical and electrical connectivity between the reusable device part 20 and the cartridge part 30. As seen in FIG. 2, the connector 25B includes two electrical terminals, an outer contact 240 and an inner contact 250, which are separated by insulator 260. The connector 25A likewise includes an inner electrode 175 and an outer electrode 171, separated by insulator 172 (as seen in FIG. 3). When the cartridge part 30 is connected to the reusable part 20, the inner electrode 175 and the outer electrode 171 of the cartridge part 30 mechanically (and hence electrically) engage the inner contact 250 and the outer contact 240 respectively of the reusable device 20. The inner contact 250 is mounted on a coil spring 255 so that during the mating (connection) process, the inner electrode 175 pushes against the inner contact 250 to compress the coil spring 255, thereby helping to ensure good mechanical and electrical contact when the cartridge part 30 is connected to the reusable part 20.

The connector 25A of FIG. 3 is also provided with two lugs or tabs 180A, 180B, which extend in opposite directions away from the longitudinal axis of the e-cigarette. These tabs are used to provide the bayonet fitting for connecting the cartridge part 30 to the reusable device part 20.

As should be appreciated by the skilled person, the cartridge part 30 shown in FIG. 3 contains many components, in particular the heating element 155, electrical contacts 166, 167, etc. and may also include the (not shown) temperature sensor. Generally, the more components included in the cartridge part, the higher the cost of the cartridge part 30, either through the sheer number of components used or through the manufacturing costs associated with assembling numerous components within the cartridge part 30. This means the cost per cartridge part 30 is relatively high. As described above, the cartridge part 30 is replaceable and usually disposed of once the source liquid has been consumed.

The present inventors have realized ways of reducing the cost of goods for cartridge parts and reducing the complexity of manufacture. The present disclosure exemplifies an e-cigarette which removes the heating element from the cartridge part and instead places the heating element within the reusable device part. As a result, the cost of goods for the cartridge part is reduced (at the very least because more complex/expensive components, such as the metal components used for the heating element/electrical contacts, are not routinely disposed of). Moreover, moving the heating element to the reusable device part (which is not routinely disposed of) means that more expensive/complex heating elements (potentially with a longer lifetime and a greater heating efficiency) can be used in the reusable device part.

Figure 4:
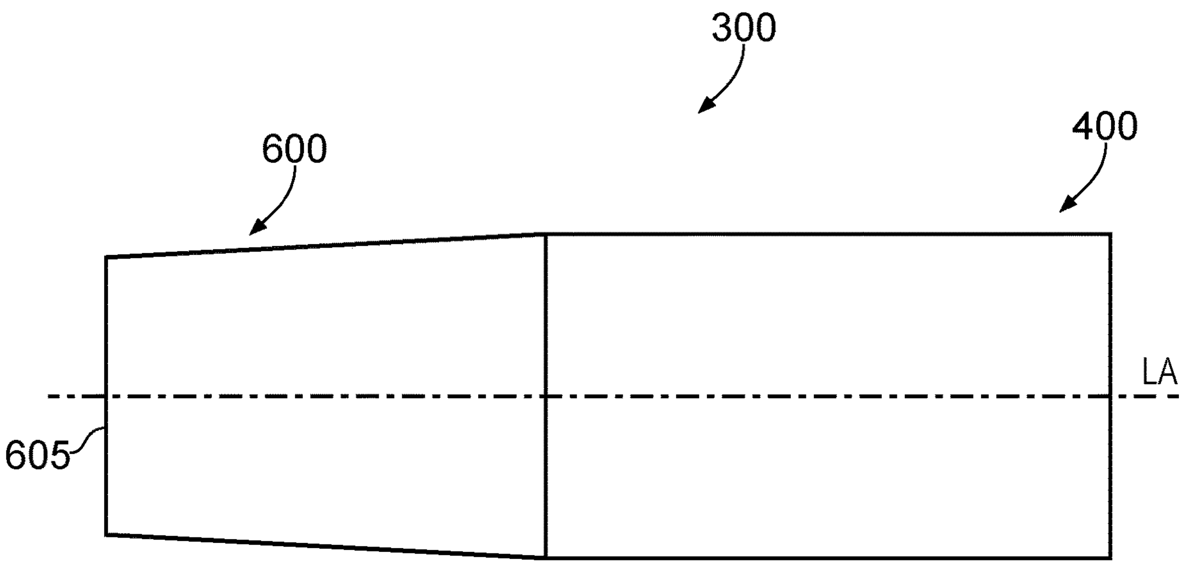
FIG. 4 schematically represents an electronic aerosol provision system including a reusable device part having a protruding heater and a cartridge part having a retracted heat-transfer element for generating an aerosol to be inhaled in a coupled state, in accordance with an aspect of the present disclosure.

FIG. 4 is a schematic diagram illustrating an e-cigarette 300 in accordance with aspects of the present disclosure. The e-cigarette 300 has a generally cylindrical shape, extending along a longitudinal axis indicated by dashed line LA, and comprises three main components, namely a reusable part 400, an (optional) cover 600, and a cartridge part 500 (not shown in FIG. 4). The cross-section through the cylinder, i.e., in a plane perpendicular to the line LA, is generally circular in this example implementation; however, other implementations may have cross-sectional shapes such as elliptical, square, rectangular, hexagonal, or some other regular or irregular shape as desired. It should also be appreciated that other embodiments of e-cigarettes 300 may have shapes other than generally cylindrical, e.g., a generally ellipsoidal shape.

In the embodiment shown in FIG. 4, the reusable device part 400, cover 600 and cartridge part 500 are detachable from one another by separating in a direction parallel to the longitudinal axis LA, but are joined together when the device 300 is in use by a connection which provides mechanical connectivity between the three main components. When the e-cigarette 300 is assembled, the cartridge part 500 is covered/obscured from sight by the cover 600. The cover 600 has a generally truncated right circular cone shape which narrows at a mouthpiece end 605. The mouthpiece end 605 contains an opening through which vapor generated from a source liquid held in the cartridge 500 can pass to a user as the user inhales on the mouthpiece end 605. The cover 600 is generally hollow and receives the cartridge 500 therein.

In the implementation shown, a user must first remove the cover 600 to expose the cartridge 500 by pulling the cover 600 in a direction parallel to the longitudinal axis LA with respect to the reusable device part 400. The connection between cover 600 and reusable part 400 may be any suitable connection, e.g., a press-fit or interference fit connection. It will be appreciated that other embodiments may use a different form of connection, such as a snap fit or a screw connection. In a similar manner, once the cartridge part 500 is exposed, the user may detach the reusable device part 400 and cartridge part 500 by separating in a direction parallel to the longitudinal axis LA. The cartridge part 500 is detached from the reusable device part 400 for replacement of the cartridge part 500 when the supply of source liquid is exhausted and/or when the user desires to change the flavor/type of source liquid.

Figure 5:
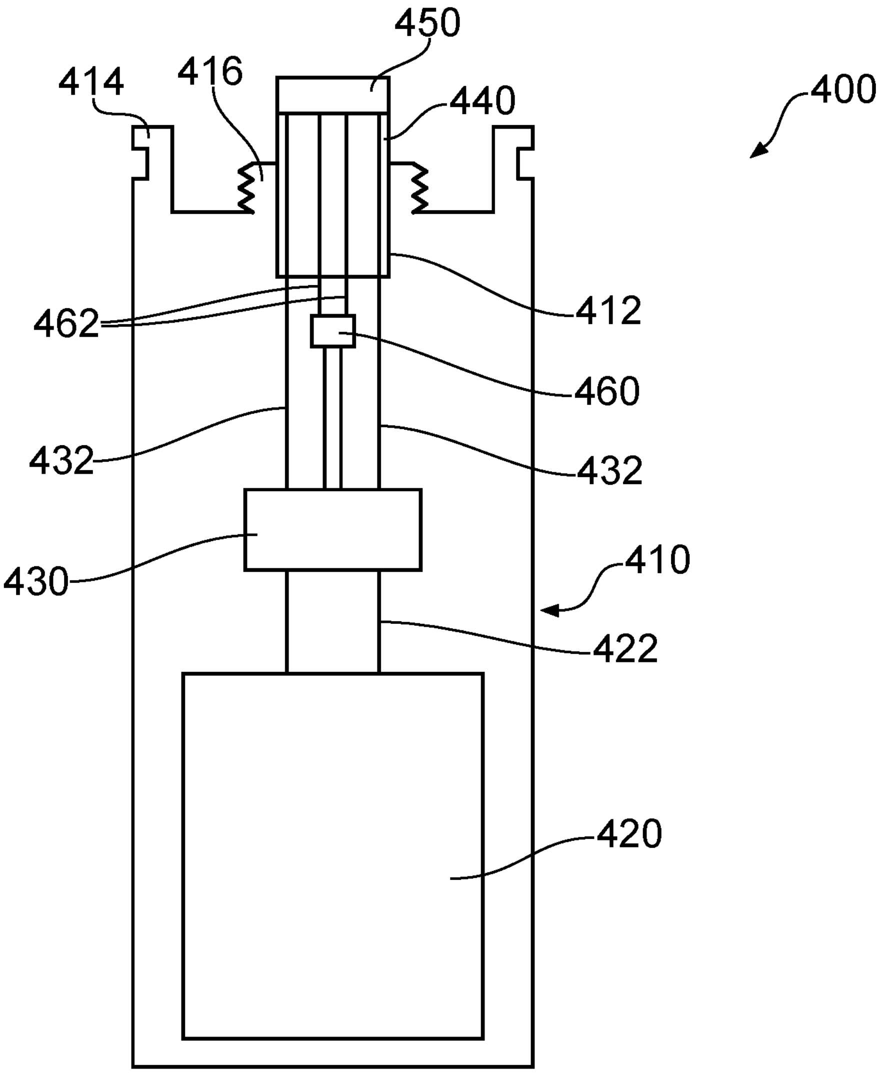
FIG. 5 schematically represents the reusable device part of the electronic aerosol provision system of FIG. 4 in more detail.

FIG. 5 schematically shows the reusable device part 400 of FIG. 4 in more detail. The reusable device part 400 includes a housing 410, a power supply, such as a battery 420, circuit board 430, a heater support 440, and a heater 450. The housing 410 has a generally cylindrical shape, extending along the longitudinal axis LA. The housing 410 includes an internal space in which the battery 420 and circuit board 430 are located. The battery 420 is generally cylindrical and, in some implementations, has a profile that is generally similar to the housing 410 in order to fit snuggly within the hollow interior of the housing 410.

The battery 420 is connected to the circuit board 430 through electrical contacts 422. In FIG. 5, the electrical contacts are shown schematically as wires although it should be appreciated that any form of electrical contact between the battery 420 and circuit board 430 would be appropriate, e.g., contact pads, and may be determined by the specific application at hand. The circuit board 430 is configured to control the various functions of the e-cigarette 300, and may be referred to herein as the control circuitry. For example, the control circuitry may control the power supply to the heater 450, the charging of the battery 420 from an external source (e.g., via connection of an external power supply with a USB/microUSB port located in the housing 410), or any other functionality such as data communication to a host computer (e.g., a personal PC, smartphone, etc.). The circuit board 430 may include a (micro)controller, processor, ASIC or similar form of control chip in order to realize this control functionality. Moreover, the control chip may be mounted to a printed circuit board (PCB). Note also that the functionality provided by the circuit board 430 may be split across multiple circuit boards and/or across components which are not mounted to a PCB, and these additional components and/or PCBs can be located as appropriate within the e-cigarette. For example, the functionality of the circuit board 430 for controlling the (re)charging functionality of the battery 420 may be provided separately (e.g. on a different PCB) from the functionality for controlling the discharge (i.e., for providing power to the heater).

As mentioned, the reusable device part 400 further includes a heater 450. The heater 450 is mounted to the heater support 440 which is in turn attached to the housing 410 at one end thereof (i.e., the end of the housing 410 that is configured to couple with the cartridge part 500 and/or cover 600). The heater support 440 has a generally cylindrical shape, although it should be appreciated that other shapes for the heater support 440 are possible in other implementations. As shown in FIG. 5, the housing 410 includes a generally circular/cylindrical recessed portion 412 into which the cylindrical heater support 440 fits. The heater support 440 is attached to the housing 410 using any suitable means, e.g., via adhesive or via a press fit/interference fit engagement with the recessed portion 412. In this example, the heater support 440 is made entirely of a material having a relatively low heat conductivity, e.g., silicone. The heater support 440 may also be formed of a material having some flexibility/resilience, e.g., silicone. That is, the heater support 440 is configured to both support the heater 450 and act as a heat insulator to prevent or reduce heat dissipation from the heater 450 to other areas of the reusable device part 400. In alternative implementations, the heater support 440 may be a multi-layered/multi-part structure having the layer(s) closest to the heater 450 configured to act as a heat insulator.

The heater 450 is shown in FIG. 5 positioned on top of the heater support 440. The heater 450 is attached to the heater support 440 in any suitable manner, e.g., via a suitable, heat-resistant adhesive, or via an interference fit with the heater support 440. In some implementations, the heater support 440 may have a shape configured to receive at least a part of the heater 450, e.g., the heater support 440 may have a lipped portion facing radially inward to receive the outer edges of the heater 450.

In the example shown in FIG. 5, the heater 450 is a planar member having a circular-cross section along a central axis thereof (e.g., a disk-shaped member) and is formed from an electrically conductive material configured to act as a resistive heater (e.g., Nichrome). The heater 450 is electrically connected to the circuit board 430 through wires 432, which pass through the heater support 440 (which has suitable channels formed therein for the wires to be threaded through). During formation of the reusable part 400, the wires 432 may protrude out from the recessed portion on the housing 410 and the heater support 440 may be slid into the recessed portion while the wires 432 pass through the channels in the heater support 440. The wires 432 are then electrically coupled to the heater 450 in any suitable manner, e.g., via soldering or by contacting the heater 450. In the latter case, the ends of the wires 432 may be bent to allow the wires 432 to run perpendicular to the longitudinal axis of the heater support 440 to increase the surface area of the heater 450 that the wires 432 contact to ensure a good electrical connection.

The circuit board 430 is configured to supply electrical power to the heater 450. The circuit board 430 receives power from the battery 420 via contacts 422 and supplies power to the heater 450 via wires 432 in response to a detected input. In some implementations, the detected input is a signal indicative of a button press which is received by the circuit board 430 in response to the user pressing a button (not shown) on the surface of the housing 410. In other implementations, the reusable device part 400 is provided with a puff sensor (not shown) configured to detect the flow of air through the reusable device part 400 in response to a user inhaling air through the e-cigarette (that is, when the reusable device part 400 and cartridge part 500 are coupled for use). Although the air path is not shown on FIG. 5, in some implementations the housing 410 is provided with air inlet holes which are fluidly connected to air inlet holes provided in the cartridge part 500 (discussed later). Accordingly, as the user inhales at the mouthpiece end 605 of the cover 600 when the reusable device part 400, cartridge part 500, and cover 600 are coupled for use, the circuit board 430 receives a signal from the puff sensor and begins supplying power to the heater 450.

As power is supplied to the heater 450 by the circuit board 430, the temperature of the heater 450 increases. The temperature of the heater 450 can, in some implementations, be monitored via a temperature sensor 460 located in the reusable device part 400. For example, as shown in FIG. 5, the temperature sensor 460 is located in the housing 410 of the reusable device part 400 and electrically connected to the circuit board 430 and the heater 450 via wires 462. The temperature sensor 460 may be a thermocouple, resistance temperature detector (RTD), or other suitable temperature sensor and is configured to output a signal indicative of the temperature of the heater 450 to the circuit board 430. The circuit board 430 is configured to adjust the power output/supplied to the heater 450 from the battery 420 in response to the received temperature signal. For example, the circuit board 430 may be configured to supply power to the heater 450 using a pulse width modulation (PWM) technique and may adjust the duty cycle to either increase or decrease the power supplied to the heater based on the temperature of the heater 450. It should be appreciated that temperature control/monitoring of the heater 450 is an optional feature and may not be present in some implementations. Equally, in other implementations, the control circuitry may measure the electrical resistance of the heater 450 and use a change in electrical resistance as an indication of the temperature of the heater 450.

Turning back to the housing 410, the housing 410 shown in FIG. 5 includes a first engagement mechanism 414 and a second engagement mechanism 416, schematically shown in FIG. 5 as protrusions which extend in a direction away from the body of the housing 410 and that form an annulus when viewed along the longitudinal axis LA. The first engagement mechanism 414 is configured to engage with the cover 600 (which has a corresponding engagement mechanism configured to co-operatively engage with the first engagement mechanism 414). The engagement mechanisms between the cover 600 and housing 410 may take any suitable form, e.g., screw-fit, bayonet fit, press-fit, snap-fit, etc. For example, the cover 600 may include a lip (not shown) that is received in a recess that runs around the outer surface of the annular protrusion 414. In a similar manner, the second engagement mechanism 416 is configured to co-operatively engage with a corresponding engagement mechanism 515 of the cartridge part 500. The annular protrusion of the first engagement mechanism 416 in this example surrounds the outer surface of the heater support 440 (or in other words, the annular protrusion has an internal diameter which receives the heater support 440). The annular protrusion of the first engagement mechanism 416 in this example has a threaded portion on its radially outer surface which engages with a threaded part of the cartridge part 500 (described in more detail below).

Figure 6:
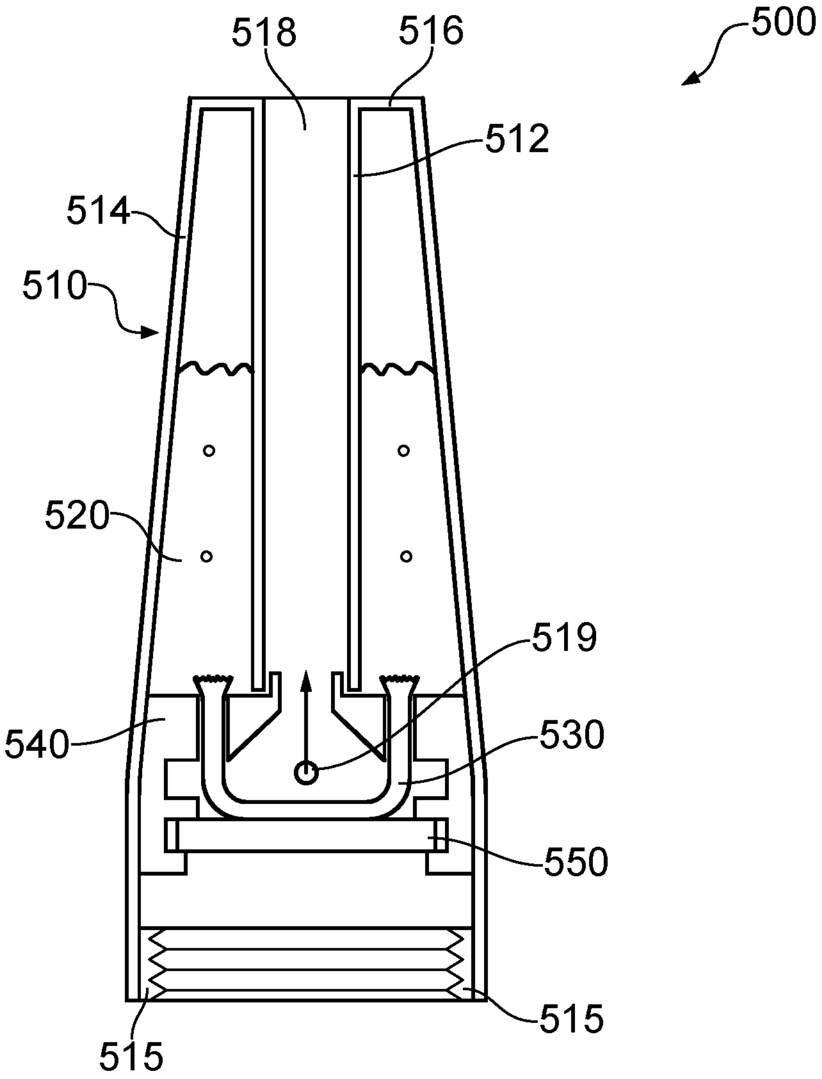
FIG. 6 schematically represents the cartridge part of the electronic aerosol provision system of FIG. 4 in more detail.

FIG. 6 schematically shows a cartridge part 500 suitable for use with the reusable device part 400 of FIG. 4. The cartridge part 500 shown in FIG. 6 includes a housing 510, a source liquid reservoir 520, a wick 530, a supporting member 540, and a heat-transfer element 550.

The housing 510 of the cartridge part 500 generally takes the shape of a truncated right circular cone and, in this implementation, is sized so as to be received in the hollow volume of the cover 600. That is, the diameter and taper angle of the housing 510 are provided to enable the cover 600 to be placed over the cartridge 500 such that the cover 600 surrounds the majority of the outer surfaces of the cartridge part 500. It should be noted, however, that both the shape of the housing 510 and the presence of the cover 600 are not essential requirements. Thus, the housing 510 could take a different shape and cover 600 may not be present.

The housing 510 is arranged to have walls that generally extend in the direction of the longitudinal axis LA of the device 300. More specifically, the cartridge part 500 is arranged to have a tubular inner wall 512 that extends in the direction of the longitudinal axis LA, a tubular outer wall 514 that extends substantially in the direction of the longitudinal axis LA but provided with a taper angle such that the diameter thereof increases toward the end of the cartridge part 500 configured to engage with the reusable device part 400 (the lowermost end in FIG. 6), and an annular upper wall 516 configured to connect the ends of the tubular inner and outer walls 512, 514 together.

The outer tubular wall 514 has a characteristic length in the longitudinal axis LA direction that is longer than the inner tubular wall 512. The supporting member 540, which has a generally cylindrical shape and an outer diameter that is approximately equal to the inner diameter of the outer tubular wall 514, is placed inside the outer tubular wall 514 such that the outer surface of the supporting member 540 contacts the inner surface of the outer tubular wall 514. The supporting member 540 is pressed into the housing 510 such that it is arranged to abut against an end of the inner tubular wall 512, as shown in FIG. 6. In this configuration, the supporting member 540 provides an annular surface that extends between an end of the inner tubular wall 512 and the inner surface of the outer tubular wall 514. In other words, the supporting member 540, inner and outer tubular walls 512, 514, and annular upper wall 516 define an enclosed volume. This volume is the source liquid reservoir 520, into which any suitable liquid for vaporization may be placed. The supporting member 540 can be considered to seal the open ends of the tubular walls.

Figure 7A:
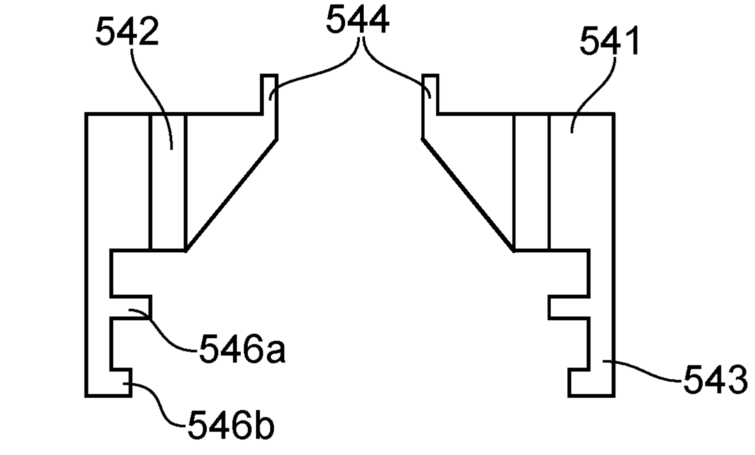
FIG. 7*a* schematically represents the supporting member of the cartridge part, for supporting the heat-transfer element, of FIG. 6 in cross-section.
Figure 7B:
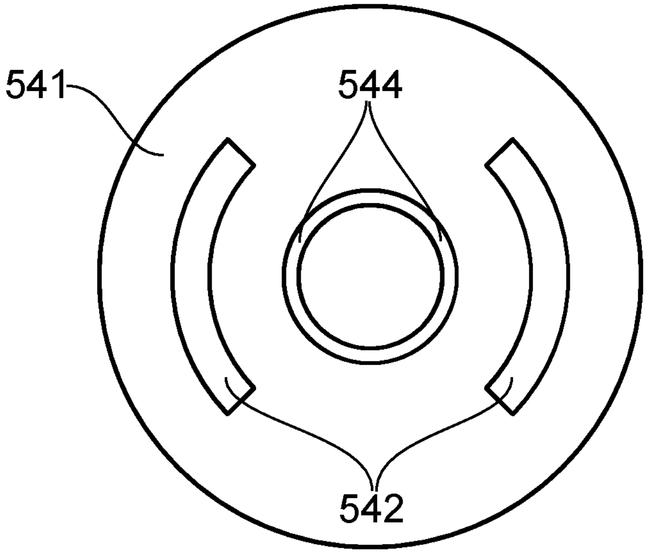
FIG. 7*b* schematically represents the supporting member of FIGS. 6 and 7*a* as viewed from above.

FIGS. 7*a* and 7*b* schematically show the supporting member of FIG. 6 in more detail. FIG. 7*a* schematically shows the supporting member 540 in cross-section through a plane parallel to the longitudinal axis LA, whereas FIG. 7*b* schematically shows the supporting member 540 as viewed from above in a direction along the longitudinal axis LA.

The supporting member 540 is configured to provide several functions. In particular, the supporting member 540 defines a part of the liquid reservoir 520 (and so performs a sealing function) but is also configured to provide access to the liquid reservoir 520 (to allow the wick 530 to transport the fluid to the heat-transfer element 550) and to provide support to the heat-transfer element 550.

In this particular implementation, the supporting member 540 is formed as a single component of a heat resistant material, such as silicone. A heat resistance material is chosen in order to reduce the dissipation of heat from the heat-transfer element 550 to other parts of the cartridge part 500. The supporting member 540 may also be formed from an elastically resilient material, again such as silicone, which permits some degree of flexibility and helps seal the liquid reservoir 520. In other implementations, the supporting member 540 may be formed of several different materials/components each configured to perform one or more of the above functions.

As seen in FIG. 7*a*, the supporting member 540 includes a main body part 541 which approximates a ring, a leg part 543 which extends in a first direction from the outer periphery of the main body part 541, through holes 542 provided in the main body part 541 and extending from a first (top) side to a second (bottom) side, opposite the first side of the main body part 541, an annular sealing lip 544 which extends from the inner periphery of the main body part 541 in a second direction, opposite the first direction, and supporting arms 546*a*, 546*b* which extend radially inwardly from the leg part 543.

As should be appreciated from the foregoing description, the main body part 541 of the supporting member 540 is the component that extends between an end of the tubular inner wall 512 and the inner surface of the outer tubular wall 514 to define the enclosed volume of the liquid reservoir 520.

In order to prevent or reduce liquid flow between the supporting member 540 and the housing 510, the supporting member 540 is formed of a resilient material. As the supporting member 540 is pressed further into the cartridge part 500 (i.e. between the inner surface of the outer tubular wall 514) the supporting member 540 is gradually compressed by the tapering outer tubular wall 514. The supporting member 540 may have an outer diameter/dimension which is slightly larger than the internal diameter of the outer tubular wall 514. For example, this difference may be of the order of a few mm. When the supporting member 540 can no longer be inserted further into the outer tubular wall 514 (e.g., because it abuts the ends of inner tubular wall 512) the supporting member 540 is compressed to the extent that liquid cannot easily flow between the supporting member 540 and the outer tubular wall 514. In some other implementations, the outer tubular wall 514 may be shaped to provide an engaging surface with the supporting member 540 (e.g., by providing a stepped configuration where the wall 514 has relatively thinner and thicker thicknesses). Alternatively, or additionally, the supporting member 540 may be held in place in any suitable way, e.g., via adhesive, screws, etc.

In order to reduce or prevent leakage between the supporting member 540 and the inner tubular wall 512, the annular sealing lip 544 is arranged to contact and/or press against the tubular inner wall 512. For example, the annular sealing lip 544 may have an outer diameter that is slightly larger than the inner diameter of the inner tubular wall 512 such that the annular sealing lip 544 is pushed radially inwardly as the supporting member 540 is inserted into the housing 510 (e.g., by being pushed radially inward by the tubular inner wall 512).

As mentioned, the supporting member 540 is provided with two through holes 542 which allow fluid to flow out of the liquid reservoir 520. These through holes 542 are configured to receive respective ends of the wick 530. The through holes 542 may take any shape desired. For example, the through holes in the example shown in FIGS. 6, 7*a*, and 7*b* are curved slots. The length of these slots 542 is in the order of a few mm while the radius of curvature of the slots 542 is broadly the same as the radius of curvature of the cylindrical supporting member 540 (see FIG. 7*b*). In other implementations the through holes 542 may be circular or straight (i.e., not curved) slots. Each end of the wick 530, which in this implementation is a planar sheet of fibrous wicking material taking a generally rectangular shape, is passed through the through holes 542 such that the wicking material fills the through holes 542. That is, the characteristic extent in the width direction of the generally rectangular wick 530 is greater than the characteristic extent of the length of the slots 542. This helps reduce the chance of liquid leakage through the through holes 542 (e.g., by gaps between the wick 530 and through holes 542). Accordingly, source liquid in the source liquid reservoir 520 can be wicked from the source liquid reservoir 520 along the length of the wick 530 via capillary action. The wick 530 may be formed of any suitable material to perform this function, e.g., cotton, ceramic, glass fibers, etc. Herein, the wick 530 may also be referred to as a liquid transport element.

The wick 530 in this implementation has a characteristic extent in the length direction that is greater than the distance between the slots 542 in the supporting member 540. When the ends of the wick 530 are inserted into the slots 542, the wick 530 extends in a direction towards the end of the cartridge part 500 that engages with the reusable part 400, and generally forms a U-shape, as shown in FIG. 6. The U-shaped wick 530 is configured to contact the heat-transfer element 550 and provides an interface between the liquid reservoir and the heat-transfer element 550.

The supporting member 540 is additionally configured to receive the heat-transfer element 550. The heat transfer element 550 is in this implementation a planar member having a circular cross-section when viewed in a direction along the longitudinal axis LA when the e-cigarette 300 is assembled and has a certain thickness in a direction parallel to the longitudinal axis LA. The heat transfer element 550 has two major surfaces, a contact surface (which in FIG. 6 is the lowermost circular surface of the heat-transfer element 550) and a vaporization surface (which in FIG. 6 is the uppermost surface circular surface of the heat-transfer element 550 that abuts the wick 530) which is opposite the contact surface.

The supporting member 540 is provided with an upper supporting arm 546*a* and a lower supporting arm 546*b* both of which protrude radially inwardly from the leg portion 543 but are separated from each other in the direction of the longitudinal axis LA. The separation distance is set relative to the thickness of the heat-transfer element 550. In essence, the heat-transfer element 550 is inserted into the supporting member 540 such that the upper arm 546*a* abuts the vaporization surface of the heat-transfer element 550 while the lower arm abuts the contact surface of the heat-transfer element 550. In effect, the supporting arms 546 retain the heat-transfer element 500 in a generally fixed position relative to the supporting member 540.

In order to assemble the supporting member 540, the wick 530 is threaded through the slots 542 as described above. Next, the heat-transfer element 550 is inserted between the arms 546, e.g., by working the disc-like heat-transfer element 550 through the holes defined by the annular arms 546. This may be made easier by forming the supporting member 540 from a flexible material (e.g., silicone). The arms 546 define annular protrusions extending from the leg 543. In the example shown, the upper supporting arm 546*a* has an inner diameter that is smaller than the inner diameter of the lower supporting arm 546*b*. The upper supporting arm 546*a* acts as a stopper to prevent the heat-transfer element 550 from being pushed into the supporting member 540 beyond the upper arm 546*a*. Lower arm 546*b* is provided to retain the heat-transfer element 550 in position but has a smaller inner diameter to enable the heat-transfer element 550 to be pressed into position between the arms 546. When in position, the heat-transfer element 550 slightly compresses the U-shaped wick 530, essentially flattening out the curve of the U-shape. This increases the surface area of the wick 530 that is in contact with the vaporization surface of the heat-transfer element 550 and additionally ensures constant contact between the vaporization surface of the heat-transfer element 550 and the wick 530. More generally, the wick 530 is said to be in fluid communication with the wick 530 (and ultimately also in fluid communication with the source liquid stored in the liquid reservoir 520 and transported by the wick). Wick 530 can take other forms which maximize transfer of liquid from the reservoir and also maximize contact with the vaporization surface.

Turning back to FIG. 6, as mentioned, the cartridge part 500 includes an engagement mechanism 515 configured to cooperatively engage with the second engagement mechanism 416 of the reusable part 400. In this example, the engagement mechanism 515 is formed on the inner surface of the outer tubular wall 514 and includes a threaded section 515. The threaded section 515 is arranged to engage with the outer threaded surface of the second engagement mechanism 416. In other words, to install or remove the cartridge part 500 from the reusable device part, the user twists the cartridge part 500 (and/or reusable device part 400) about the longitudinal axis to engage/disengage the threaded portions. As mentioned, other engagement mechanisms are possible and the exact engagement mechanism used is not significant to the principles of the present disclosure, e.g., bayonet fit, press-fit, etc.

When the cartridge part 500 is coupled to the reusable device part 400, the heater 450 is arranged to engage with/contact the heat-transfer element 550. During use, the heater 450 is supplied with power and is subsequently heated. The heater 450 exchanges its heat with the heat-transfer element 550, such as through conduction.

In the implementation described and as shown in FIGS. 5 and 6, the heater 450 protrudes a certain distance from the reusable device part 400 while the heat-transfer element 550 is provided recessed or retracted into the body of the cartridge part 500. In the implementation described, the distance between the end of the cartridge part 500 (the end that couples to the reusable part) and the heat-transfer element 550 is slightly less (e.g., 2 to 5 mm less) than the distance the heater 450 protrudes from the surface of the reusable part 400. In this way, when the cartridge part 500 is coupled to the reusable part 400, the heater 450 contacts and pushes the heat-transfer element 550 in a direction along the longitudinal axis LA into the supporting member 540/cartridge part 500. The resilient supporting member 540 permits some movement of the heat-transfer element 550 in an axial direction (e.g., along the longitudinal axis LA) but is also biased to resist such movement. Additionally, or alternatively, the resilient heater support 440 permits some movement of the heater 450 in an axial direction (e.g., along the longitudinal axis LA) but is also biased to resist such movement. Accordingly, by providing this difference in the relative distances, the heater 450 can be forced into direct contact with the heat-transfer element 550, which is subsequently biased onto a surface of the heater 450. This can ensure a reliable and constant contact between heater 450 and heat-transfer element 550. In some cases, this pushing of the heat-transfer element 550 further into the body of the cartridge part 500 also forces the supporting member 540 further into the body of the cartridge part 500 which causes the supporting member 540 to be pressed further against the inner surface of the outer tubular wall 514 and the inner tubular wall 512, which may help improve the sealing between support member 540 and housing 510. In addition, the pressing force generated when coupling the cartridge part 500 and reusable device part 400 can cause the heat-transfer element 550 to deform/bend slightly, particularly if the heater 450 contacts only a part of the heat-transfer element 550.

The heat-transfer element 550 is formed of a heat-conductive material, e.g., a metal. In use, electrical power is supplied to the heater 450 from battery 420 in response to a user input (which might be a button press or detection of a user's puff). This causes the heater 450 to increase its temperature, e.g., up to a vaporization temperature of around 200° C. or to a higher temperature (which might be governed by heat transfer inefficiencies within the system). Heat generated by the heater 450 is transferred, e.g., through thermal conduction, to the heat-transfer element 550. This causes the heat-transfer element 550 to increase in temperature up to a temperature sufficient to vaporize source liquid contained in the wick 530 to generate a vapor of the source liquid, e.g., of around 200° C. (herein referred to as the vaporization temperature). It should be appreciated that different source liquids may have different vaporization temperatures.

Hence, when the device part 400 and the cartridge part 500 are coupled together for use, the heater 450 and the heat-transfer element 550 are said to be in thermal communication. That is, heat is transferred/transported from the heater 450 in the device part 400 to the heat-transfer element 550 in the cartridge part 500 to cause the heat transfer element 500 to heat up. One aspect of the present disclosure is that the heat source (i.e., the element/component that generates heat) is located in the device part and not in the cartridge part.

The heat-transfer element 550 can take any desired shape, have any thickness, and be formed of any thermally conductive material. However, in order to ensure efficient heating (and efficient power use), careful selection of the parameters of the heat-transfer element 550 are required for the specific application at hand. Reducing the overall thickness or surface area of the heat-transfer element 550 means that relatively less energy is required to bring the heat-transfer element 550 to a vaporization temperature (or rather, the heat transfer from the contact surface to the vaporization surface of the heat-transfer element is improved). Alternatively (or additionally), the type or density of the material the heat-transfer element 550 is made from can also impact the heating efficiency, e.g., being formed from a material with a particularly good heat conductance can improve the overall energy efficiency. As an example, a heat transfer element 500 made from a thin piece of aluminum has a relatively higher thermal conductivity and low density (2.7 g/cm$^3$) as opposed to a heat-transfer element made from a similar thickness of steel (7.8 g/cm$^3$). However, there is a trade off as the thinner aluminum offers less structural rigidity than the steel, so might be unsuitable for applications where robustness is of more importance.

Generally the materials forming the heat-transfer element 550 can be selected in order to have a certain density, specific heat capacity, thermal conductivity and robustness for the application at hand. Once the heat-transfer element 550 is heated up to the vaporization temperature, source liquid stored in the wick 530 and that is in contact with or close proximity to the vaporization surface of the heat-transfer element 550 is vaporized. Referring to FIG. 6, vapor is generated predominantly in the region above the vaporization surface of the heat-transfer element 550. An air inlet 519 is provided in the cartridge part 500 which permits air to flow from outside the cartridge part 500 (i.e., outside housing 510) into the cartridge part 500. In this implementation, a first aperture is provided in the tubular outer wall 514 and a second aperture is provided in the supporting member 540, whereby these two apertures, when aligned with one another, define the air inlet 519. The aperture in the tubular outer wall 514 may be larger than the aperture in the supporting member 540 to account for alignment discrepancies in the assembling process. A second air inlet is provided either in the cover 600 or in the housing 410 of the reusable device part 400 to enable air outside of the device 300 to pass to air inlet 519. As the user inhales through mouthpiece 605 of the cover 600, air is drawn in from outside the cover 600 or housing 410, and passes through air inlet 519 of the cartridge part 500 where it mixes with/collects the generated vapor to form an aerosol. The aerosol travels along an air passage 518, which is defined by the inner surface of the inner tubular wall 512. The aerosol is then passed along the air passage 518 and out of the upper end of the cartridge part 500, and through the mouthpiece 605 of the cover 600 into the user's mouth/lungs.

In some implementations, a sealing member, such as an O-ring (not shown), may be provided on the annular upper wall 516 of the cartridge part 500 to surround the open end of the air passage 518 and arranged to engage with the cover 600 (i.e., be compressed by a surface defining the inner hollow part of the cover 600) to prevent or reduce aerosol from passing between the housing 510 of the cartridge part 500 and the inside of the cover 600.

Figure 8:
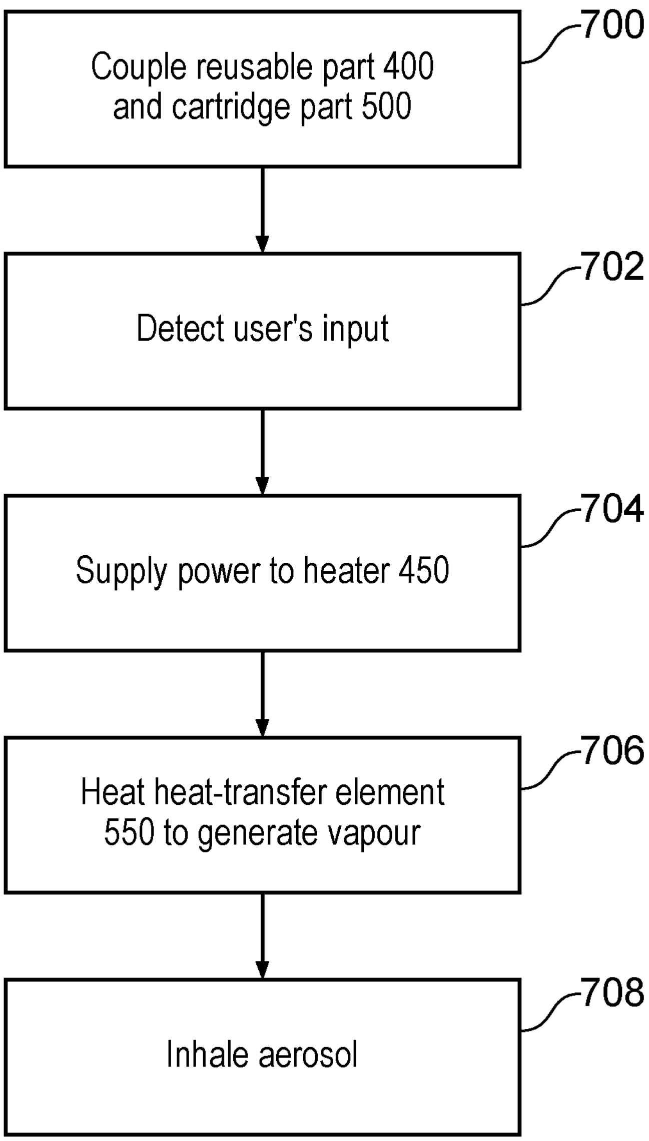
FIG. 8 schematically represents an example method for using an electronic aerosol provision system, such as the electronic aerosol provision system of FIG. 4.

FIG. 8 represents an example method of using the aerosol provision system 300 in the form of a flow chart. The method starts with the aerosol provision system 300 in its separated condition, that is with reusable device part 400 separated from cartridge part 500 and cover 600.

At 700, the user couples the reusable device part 400 to the cartridge part 500, e.g., by screwing the cartridge part 500 onto the reusable device part 400 such that engagement mechanism 416 engages with engagement mechanism 515. The user may also couple the cover 600 to the reusable device part 400 once the cartridge part 500 is coupled to the reusable part 400, e.g., by clipping a lip (not shown) of the cover 600 into a recess provided in engagement mechanism 414.

At 702, the aerosol provision system 300 detects a user's input indicative of a user's desire to be provided with aerosol. As mentioned, this could be through detecting a user's interaction with a button or similar mechanism provided on the surface of the reusable device part 400, or alternatively, could be through detecting a change in pressure or an airflow (using an airflow or pressure sensor) as the user inhales on the system 300. More specifically, control circuitry 430 detects the user's input (in whatever form).

At 704, power is supplied to the heater 450. More specifically, control circuitry 430 is configured, once the user's input is detected, to control the delivery of electrical power from the battery 420 to the heater 450 (e.g., via permitting a current flow through wires 432). The power may be supplied in any appropriate manner, e.g., the power may be modulated according to a pulse width modulation technique. In addition, the control circuitry 430 may receive a reading from the temperature sensor 480 indicative of the temperature of the heater 450. The control circuitry 430 is configured to regulate the supply of power based on the temperature reading.

At 706, heat is transferred to the heat-transfer element 550. In embodiments 706 occurs in parallel with 704. Heat-transfer element 550 is raised to a vaporization temperature, and as mentioned, causes source liquid held in the wick 530 to vaporize. At 708, as the user inhales, air is drawn into the cartridge part 500 and mixes with the generated vapor before passing through the cartridge part 500 and out of an opening in mouthpiece end 605 of cover 600. The method ends with the user being provided with a generated aerosol. Of course, the method may be repeated, in which case the method may progress from 708 back to 702, in order to provide the user with another quantity of inhalable aerosol.

The aerosol provision system 300 of the present disclosure provides an aerosol provision system 300 in which there are a fewer number of different components included in the cartridge part 500 as compared, for example, to cartridge part 30 in FIG. 1. Moreover, the complexity of assembling the cartridge part 500 is reduced as compared, for example, to cartridge part 30 in FIG. 1. Both of these factors can contribute to a reduced overall cost and a simpler manufacturing process for manufacturing the cartridge part 500.

In addition, the aerosol provision system 300 includes a heater 450 within the reusable device part 400, meaning the heater 450 can be reused with a number of cartridge parts 500 and is not disposed of. This means it is more economically viable to provide a more expensive and/or more energy efficient heater in the aerosol provision system 300 as compared to the exemplary e-cigarette 10 where the heater 155 is an integral component of the disposable cartridge part 30. Moreover, in this implementation, the heater 450 does not come into contact with the source liquid at all, meaning that there is no or little chance of contamination between different cartridge parts 500. This is equally true of the generated aerosol which is permitted to flow along an air path (i.e., path 518) which is fluidly isolated from the heater 450, to thereby reduce or even prevent exposure of the heater 450 to generated aerosol. This means the device is generally more hygienic.

Thus there has been described an aerosol provision system including a device part and a removable cartridge part, wherein the cartridge part is coupled to the device part for use; and wherein the device part comprises a heater; and the cartridge part comprises a reservoir for source liquid and a vaporization surface arranged to be in fluid communication with the reservoir for source liquid, wherein the vaporization surface is brought into thermal communication with the heater when the cartridge part is coupled to the device part for use such that the vaporization surface is heated when the heater is activated to cause vaporization of at least a portion of source liquid in fluid communication with the vaporization surface. There has also been described a cartridge part, a device part, and a method of producing a vapor for inhalation.

Figure 9:
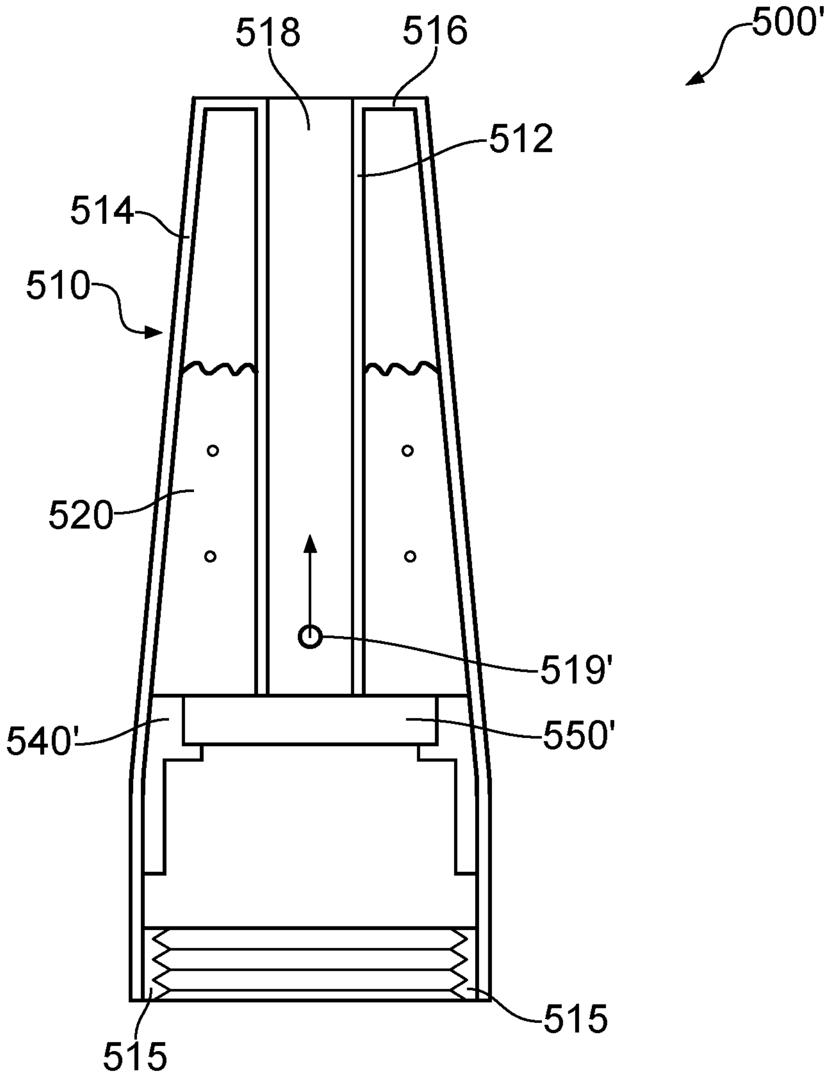
FIG. 9 schematically represents a cartridge part having a retracted heat-transfer element for generating an aerosol to be inhaled, in accordance with another aspect of the present disclosure.

The heat-transfer element 550 is described above as being formed of a metal material. However, in some implementations, the heat-transfer element 550 may be formed, partly or entirely, of a ceramic or other porous material. FIG. 9 is a schematic representation of an example cartridge part 500' including a heat-transfer element 550' formed of a ceramic material. The cartridge part 500' is configured to be used with reusable part 400 of FIG. 5 and substantially the same as cartridge part 500. For conciseness, only components that are different from cartridge part 500 are described in detail. Any components that are identical are indicated with like reference numerals and are not further described in detail herein.

The heat-transfer element 550' is shown installed in supporting member 540'. Supporting member 540' is substantially the same as supporting member 540 but supporting member 540' provides heat-transfer element 550' such that it is in direct contact with the source liquid stored in liquid reservoir 520. That is, at least parts of the uppermost surface of the heat-transfer element 550' contact the source liquid. In cartridge part 500' heat-transfer element 550' acts to wick liquid from the liquid reservoir 520—that is, the heat-transfer element 550' acts to wick source liquid from the liquid reservoir 520 to the vaporization surface. Accordingly, source liquid is stored in the heat-transfer element 550' which is subsequently heated by heater 450 of the reusable part 400 to generate a vapor at the vaporization surface from the source liquid stored in the heat-transfer element 550'. This implementation further reduces the number of components required to form cartridge part 500'. It should also be noted that air inlet 519' is provided only in the outer tubular wall 514. In some implementations, to prevent or reduce the heat transfer into the body of the source liquid stored in the liquid reservoir 520 (as opposed to the source liquid stored in the combined heat-transfer element and wick element 550'), the heater 450 may contact only part of the contact surface of the heat-transfer element 550' and not the entire contact surface.

To prevent or reduce source liquid permeating through the ceramic heat-transfer element 550' prior to use (that is, prior to coupling the cartridge part 500' to the reusable part 400), the cartridge part 500' may be provided with a removable sealing member 580'. The removable sealing member 580' is configured to cover the contact surface of the heat-transfer element 550' and be removably attached to the contact surface (e.g., via an adhesive layer). Prior to coupling the cartridge part 500' to the reusable part, the user pulls on the removable sealing member 580' (which may include a tab that can be grasped by the user) to separate the removable sealing member 580' from the contact surface of the heat-transfer element 550'. In this arrangement, some source liquid can contact the heater 450, e.g., as it drips through the heat-transfer element 550'. The heater 450 may be shaped in such a way that the surface of the heater 450 may be wiped clean, e.g., with a cloth or similar cleaning utensil, in order to reduce cross contamination.

It also should be appreciated that the combined ceramic heat-transfer and wick element 550' may also be provided with a wick element 530 to wick source liquid to the heat-transfer element 550'.

As an alternative, the heat-transfer element 550' may be formed of multiple layers where the lowermost layer (the layer forming the contact surface of the heat-transfer element 550') may be formed from a metal material (e.g., any of the materials as described above with respect to heat-transfer element 550) while the uppermost layer (the layer forming the vaporization surface) may be formed from a ceramic or porous material. In this regard, the metal layer may prevent or reduce liquid leakage through heat-transfer element 550' by acting as a barrier. As an alternative, the metal layer may be replaced by a porous ceramic or other porous material of a lower porosity in order to reduce liquid leakage through heat-transfer element 550'. That is, the heat-transfer element 550' may have a porosity gradient that increases from the contact surface towards the vaporization surface.

It should also be appreciated that for a ceramic layer or a heat-transfer element 550' formed entirely from a ceramic or porous material, the vaporization surface may be a surface that is formed anywhere within the porous material—that is, the inner surfaces of the pores may form the vaporization surface and so the vaporization surface may not necessarily be the uppermost surface of the heat-transfer element 550'.

It has been described above that the heat-transfer element 550 is mounted in the supporting member 540 which is formed of a flexible and resilient material, and that as the heater 450 (which protrudes from the reusable part 400) contacts the heat-transfer member 550, it is the flexible and resilient material of the supporting member 550 that, firstly, allows the heat-transfer element 550 to be seated further into the cartridge part 500 and, secondly, biases the heat-transfer element 550 towards the heater 450. However, in other implementations, the heat-transfer element 550 is mounted to a rigid, but movable component that is movably provided with respect to the housing 510 of the cartridge part 500. In a similar manner, as the protruding heater 450 contacts the heat-transfer element 550 as the cartridge part 500 is coupled to the reusable part 400, the movable component is forced into the housing 510 of the cartridge part 500. The biasing force mentioned with regards to the flexible and resilient supporting member 450 may be applied via a biasing member, such as a spring, for example.

Although the heat-transfer element 550, 550' has generally been described as a planar member having a circular cross-section, it should be appreciated that in other implementations the heat-transfer element 550, 550' may not be a planar member. For example, the heat-transfer element 550 may have a parabolic shaped vaporization (upper) surface. That is, the heat-transfer element 550 may not have a uniform thickness. This may alter the properties of the vapor that is generated by altering the temperature across the surface of the heat-transfer element and/or alter the energy required to bring the heat-transfer element 550 up to a vaporization temperature.

Although the heater 450 has been described as a planar member having a circular cross-section, it should be appreciated that the heater may take any desired shape. For example, the heater 450 may have a rectangular cross-section when viewed along the central axis LA of the e-cigarette 300. Different cross-sections may be employed for different purposes. In some cases, minimizing the mass of the heater 450 may be desirable in order to reduce power consumption when bringing the heater 450 up to an operating temperature. This may be achieved by altering the cross-sectional shape or the thickness of the heater 450. In addition, the contact surface of the heat-transfer element 550 in some implementations is arranged to match the cross-sectional shape of the heater 450—that is, the surface of the heater 450 that contacts the heat-transfer element 550 and the surface of the heat-transfer element 550 that contacts the heater 450 are arranged to have a similar area and a similar shape.

Although the heater 450 has been described as a resistive heater, it should be understood that the heater 450 may be heated by any suitable heating means, e.g., induction, radiation etc. For example, rather than supply electrical power directly to an electrically resistive plate, the heater may instead be formed of a work coil and a susceptor plate, wherein the susceptor plate is heated by penetrating magnetic fields generated by passing an electric current through the work coil. In a similar way, the heated susceptor plate physically makes contact with the heat-transfer element 550 to transfer its heat to the heat-transfer plate and subsequently vaporize the liquid within the wick 530. More generally, the heater 450 can be thought of as a heat source, i.e., it is the component that initially generates heat for vaporizing the aerosol source material.

In some implementations, the heater 450 and/or the heat-transfer element 550 are provided with an electrically insulating layer. This is particularly the case when the heater 450 is a resistance heater or other type of heater where an electrical current is passed through the heater 450. For example, in some implementations the surface of the heater 450 that contacts the contact surface of the heat-transfer element 550 is provided with a thin layer of ceramic, e.g., aluminum oxide, etc. In cases, where the heat-transfer element 550 is formed of an electrically conductive material, providing an electrically insulating material on the heater 450 prevents electrical current from passing into/through the heat-transfer element 550. The insulating layer may also have a relatively high thermal conductivity, so that heat-transfer efficiency is not substantially affected by the presence of the layer. It should be appreciated that in other implementations, the heat-transfer element 550 may be provided with an electrically insulating layer instead of (or in addition to) the heater 450.

Although it has been described above that the aerosol provision device 300 includes a cover 600, it should be appreciated that the cover 600 is optional and may not feature in some implementations. For example, the outer housing of the cartridge part 500 may act as the cover 600, in that the cartridge part 500 is the component that the user's lips make contact with. For example, the user can place their lips around the opening to air passage 518 and inhales directly through air passage 518 (as opposed to via mouthpiece 605). The cartridge part 500 may be ergonomically shaped or made from suitable materials in order to accommodate the user's lips.

Although it has been described above that the air-inlet 519 is provided in a wall of the cartridge part 500, it is also possible for the air inlet to be provided in other configurations. For example, the heat transfer element could be perforated with one or more through holes. This allows air to flow past the wicking element. In this implementation, the air ingress into the cartridge part may be achieved via a relatively air permeable connection between the cartridge part and the reusable device part.

While the above described embodiments have in some respects focused on some specific example aerosol provision systems, it will be appreciated the same principles can be applied for aerosol provision systems using other technologies. That is to say, the specific manner in which various aspects of the aerosol provision system function are not directly relevant to the principles underlying the examples described herein.

In order to address various issues and advance the art, this disclosure shows by way of illustration various embodiments in which the claimed invention(s) may be practiced. The advantages and features of the disclosure are of a representative sample of embodiments only, and are not exhaustive and/or exclusive. They are presented only to assist in understanding and to teach the claimed invention (s). It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc. other than those specifically described herein. It will thus be appreciated that features of the dependent claims may be combined with features of the independent claims in combinations other than those explicitly set out in the claims. The disclosure may include other inventions not presently claimed, but which may be claimed in future.

The invention claimed is:

1. An aerosol provision system comprising:

a device part; and a removable cartridge part, wherein the cartridge part is coupled to the device part for use;

wherein:

the device part comprises a heater, the cartridge part comprises a reservoir for a source liquid and a vaporization surface arranged to be in fluid communication with the reservoir for the source liquid, and the vaporization surface is brought into thermal communication with the heater when the cartridge part is coupled to the device part for use such that the vaporization surface is heated when the heater is activated to cause vaporization of at least a portion of the source liquid in fluid communication with the vaporization surface, wherein at least one of:

the vaporization surface is movable with respect to a body of the cartridge part in a direction along a longitudinal axis of the cartridge part, the heater is arranged such that, when the device part and the cartridge part are coupled for use, the heater causes the vaporization surface to move into the body of the cartridge part, or the vaporization surface is deformed when the device part and the cartridge part are coupled for use.

2. The aerosol provision system of claim 1, wherein the vaporization surface is heated through conduction of heat from the heater, when the cartridge part is coupled to the device part for use and when the heater is activated.

3. The aerosol provision system of claim 1, wherein at least one of:

the cartridge part is configured to prevent the source liquid from contacting the heater when the device part and the cartridge part are coupled for use, or the vaporization surface is non-porous.

4. The aerosol provision system of claim 1, wherein the aerosol provision system includes an air path along which generated aerosol is permitted to travel, wherein the heater is fluidly isolated from the air path.

5. The aerosol provision system of claim 1, wherein the heater is movable with respect to the device part in a direction along a longitudinal axis of the device part.

6. The aerosol provision system of claim 1, wherein the vaporization surface is formed from at least one of a metal or a ceramic.

7. The aerosol provision system of claim 1, further comprising a liquid transport element in fluid communication with the reservoir for the source liquid and the vaporization surface, wherein the liquid transport element is configured to transport the source liquid from the reservoir to the vaporization surface, and wherein at least one of:

the liquid transport element includes the vaporization surface, or the liquid transport element includes regions of different porosities, and wherein a region of a relatively lower porosity is arranged to face the heater when the device part and the cartridge part are coupled for use.

8. The aerosol provision system of claim 1, wherein the cartridge part includes a heat-transfer element having a first surface and a second surface, opposite the first surface, wherein at least a portion of the first surface is the vaporization surface.

9. The aerosol provision system of claim 8, wherein, when the device part and the cartridge part are coupled for use, the heater is arranged to directly contact the second surface of the heat-transfer element.

10. The aerosol provision system of claim 9, wherein the heater is arranged to press against the second surface when the device part and the cartridge part are coupled for use.

11. The aerosol provision system of claim 8, further comprising a liquid transport element in fluid communication with the reservoir for source liquid and the vaporization surface, wherein the liquid transport element is configured to transport source liquid from the reservoir to the vaporization surface, wherein the heat-transfer element includes the liquid transport element.

12. The aerosol provision system of claim 1, wherein the cartridge part includes a removable cover configured to cover the vaporization surface, to prevent liquid from dripping out of the vaporization surface, and wherein prior to coupling the cartridge part and the device part, the removable cover is removed.

13. The aerosol provision system of claim 1, wherein at least one of:

the device part is configured to determine a temperature of the heater, or the device part comprises analysis circuitry configured to analyze a temperature signal output by a temperature sensor and control circuitry configured to adjust an operational parameter of the device part based on the temperature signal.

14. A cartridge part for use with a reusable device part comprising a heater, wherein the cartridge part is capable of being coupled to the device part for use to form an aerosol provision system, the cartridge part comprising:

a reservoir for a source liquid; and a vaporization surface arranged to be in fluid communication with the reservoir for the source liquid, wherein the vaporization surface is brought into thermal communication with the heater when the cartridge part is coupled to the reusable device part for use such that the vaporization surface is heated when the heater is activated to cause vaporization of at least a portion of the source liquid in fluid communication with the vaporization surface, wherein at least one of:

the vaporization surface is movable with respect to a body of the cartridge part in a direction along a longitudinal axis of the cartridge part, the heater is arranged such that, when the device part and the cartridge part are coupled for use, the heater causes the vaporization surface to move into the body of the cartridge part, or the vaporization surface is deformed when the device part and the cartridge part are coupled for use.

15. The cartridge part of claim 14, wherein the cartridge part does not comprise a heater.

16. A method of configuring an aerosol provision device for use, the device including a device part and a removable cartridge part, the method comprising:

coupling the device part to the cartridge part, wherein the device part comprises a heater and the cartridge part comprises a reservoir for a source liquid and a vaporization surface arranged to be in fluid communication with the reservoir for the source liquid, wherein the vaporization surface is brought into thermal proximity with the heater when the cartridge part is coupled to the device part for use such that the vaporization surface is heated when the heater is activated to cause vaporization of at least a portion of the source liquid in fluid communication with the vaporization surface, wherein at least one of:

the vaporization surface is movable with respect to a body of the cartridge part in a direction along a longitudinal axis of the cartridge part, the heater is arranged such that, when the device part and the cartridge part are coupled for use, the heater causes the vaporization surface to move into the body of the cartridge part, or the vaporization surface is deformed when the device part and the cartridge part are coupled for use.

17. A vapor provision means comprising:

a reusable device part; and a removable cartridge part, wherein the removable cartridge part is coupled to the reusable device part for use, wherein:

the reusable device part comprises heating means, and the removable cartridge part comprises reservoir means for storing a source liquid and a vaporization surface arranged to be in fluid communication with the reservoir for the source liquid, and the vaporization surface is brought into thermal communication with the heating means when the removable cartridge part is coupled to the reusable device part for use such that the vaporization surface is heated when the heating means is activated to cause vaporization of at least a portion of the source liquid in fluid communication with the vaporization surface, wherein at least one of:

the vaporization surface is movable with respect to a body of the cartridge part in a direction along a longitudinal axis of the cartridge part, the heater is arranged such that, when the device part and the cartridge part are coupled for use, the heater causes the vaporization surface to move into the body of the cartridge part, or the vaporization surface is deformed when the device part and the cartridge part are coupled for use.

18. An aerosol provision system comprising:

a device part; and a removable cartridge part, wherein the cartridge part is coupled to the device part for use;

wherein:

the device part comprises a heater, the cartridge part comprises a reservoir for a source liquid and a vaporization surface arranged to be in fluid communication with the reservoir for the source liquid, and the vaporization surface is brought into thermal communication with the heater when the cartridge part is coupled to the device part for use such that the vaporization surface is heated when the heater is activated to cause vaporization of at least a portion of the source liquid in fluid communication with the vaporization surface, wherein when the device part and the cartridge part are coupled for use, the heater is arranged to directly contact the second surface of the heat-transfer element, wherein the heater is arranged to press against the second surface when the device part and the cartridge part are coupled for use, wherein the cartridge part includes a heat-transfer element having a first surface and a second surface, opposite the first surface, wherein at least a portion of the first surface is the vaporization surface, wherein, when the device part and the cartridge part are coupled for use, the heater is arranged to directly contact the second surface of the heat-transfer element, wherein the heater is arranged to press against the second surface when the device part and the cartridge part are coupled for use, wherein the cartridge part includes a heat-transfer element having a first surface and a second surface, opposite the first surface, wherein at least a portion of the first surface is the vaporization surface, and wherein at least one of:

the heat-transfer element is configured to move relative to a body of the cartridge part in a direction into the body of the cartridge part, and wherein, the heat-transfer element is biased in a direction away from the body of the cartridge part, or the heat-transfer element is attached to the body of the cartridge part through a resilient member, the resilient member allowing movement of the heat-transfer member.

19. A cartridge part for use with a reusable device part comprising a heater, wherein the cartridge part is capable of being coupled to the device part for use to form an aerosol provision system, the cartridge part comprising:

a reservoir for a source liquid; and a vaporization surface arranged to be in fluid communication with the reservoir for the source liquid, wherein the vaporization surface is brought into thermal communication with the heater when the cartridge part is coupled to the reusable device part for use such that the vaporization surface is heated when the heater is activated to cause vaporization of at least a portion of the source liquid in fluid communication with the vaporization surface, wherein the cartridge part includes a heat-transfer element having a first surface and a second surface, opposite the first surface, wherein at least a portion of the first surface is the vaporization surface, wherein when the device part and the cartridge part are coupled for use, the heater is arranged to directly contact the second surface of the heat-transfer element, wherein the heater is arranged to press against the second surface when the device part and the cartridge part are coupled for use, wherein at least a portion of the first surface is the vaporization surface, and wherein at least one of:

the heat-transfer element is configured to move relative to a body of the cartridge part in a direction into the body of the cartridge part, and wherein, the heat-transfer element is biased in a direction away from the body of the cartridge part, or the heat-transfer element is attached to the body of the cartridge part through a resilient member, the resilient member allowing movement of the heat-transfer member.

20. A method of configuring an aerosol provision device for use, the device including a device part and a removable cartridge part, the method comprising:

coupling the device part to the cartridge part, wherein the device part comprises a heater and the cartridge part comprises a reservoir for a source liquid and a vaporization surface arranged to be in fluid communication with the reservoir for the source liquid, wherein the vaporization surface is brought into thermal proximity with the heater when the cartridge part is coupled to the device part for use such that the vaporization surface is heated when the heater is activated to cause vaporization of at least a portion of the source liquid in fluid communication with the vaporization surface, wherein the cartridge part includes a heat-transfer element having a first surface and a second surface, opposite the first surface, wherein at least a portion of the first surface is the vaporization surface, wherein when the device part and the cartridge part are coupled for use, the heater is arranged to directly contact the second surface of the heat-transfer element, wherein the heater is arranged to press against the second surface when the device part and the cartridge part are coupled for use, wherein at least one of:

the heat-transfer element is configured to move relative to a body of the cartridge part in a direction into the body of the cartridge part, and wherein, the heat-transfer element is biased in a direction away from the body of the cartridge part, or the heat-transfer element is attached to the body of the cartridge part through a resilient member, the resilient member allowing movement of the heat-transfer member.

21. A vapor provision means comprising:

a reusable device part; and a removable cartridge part, wherein the removable cartridge part is coupled to the reusable device part for use, wherein:

the reusable device part comprises heating means, and the removable cartridge part comprises reservoir means for storing a source liquid and a vaporization surface arranged to be in fluid communication with the reservoir for the source liquid, and the vaporization surface is brought into thermal communication with the heating means when the removable cartridge part is coupled to the reusable device part for use such that the vaporization surface is heated when the heating means is activated to cause vaporization of at least a portion of the source liquid in fluid communication with the vaporization surface, wherein the cartridge part includes a heat-transfer element having a first surface and a second surface, opposite the first surface, wherein at least a portion of the first surface is the vaporization surface, wherein when the device part and the cartridge part are coupled for use, the heater is arranged to directly contact the second surface of the heat-transfer element, wherein the heater is arranged to press against the second surface when the device part and the cartridge part are coupled for use, wherein at least one of:

the heat-transfer element is configured to move relative to a body of the cartridge part in a direction into the body of the cartridge part, and wherein, the heat-transfer element is biased in a direction away from the body of the cartridge part, or the heat-transfer element is attached to the body of the cartridge part through a resilient member, the resilient member allowing movement of the heat-transfer member.

* * * * *